US009223124B2

(12) United States Patent
Iftime et al.

(10) Patent No.: US 9,223,124 B2
(45) Date of Patent: Dec. 29, 2015

(54) TIME RESOLVED OPTICAL MICROSCOPY ("TROM") PROCESS FOR MEASURING THE RATE OF CRYSTALLIZATION OF SOLID INKS

(75) Inventors: Gabriel Iftime, Mississauga (CA); Jennifer L. Belelie, Oakville (CA); Peter G. Odell, Mississauga (CA); Paul S. Bonino, Ontario, NY (US); Joanne L. Lee, Rochester, NY (US); Naveen Chopra, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 837 days.

(21) Appl. No.: 13/456,847

(22) Filed: Apr. 26, 2012

(65) Prior Publication Data
US 2013/0286180 A1    Oct. 31, 2013

(51) Int. Cl.
H04N 7/18        (2006.01)
G02B 21/26       (2006.01)
G02B 21/34       (2006.01)
G02B 21/36       (2006.01)

(52) U.S. Cl.
CPC ............ *G02B 21/26* (2013.01); *G02B 21/34* (2013.01); *G02B 21/36* (2013.01)

(58) Field of Classification Search
None
See application file for complete search history.

(56) References Cited

U.S. PATENT DOCUMENTS

| 4,490,731 A | 12/1984 | Vaught |
| 4,889,560 A | 12/1989 | Jaeger |
| 4,889,761 A | 12/1989 | Titterington |
| 5,221,335 A | 6/1993 | Williams |
| 5,372,852 A | 12/1994 | Titterington |
| 5,621,022 A | 4/1997 | Jaeger |
| 2001/0050364 A1* | 12/2001 | Tanaka et al. ............ 257/66 |
| 2002/0124771 A1* | 9/2002 | Hendricks ............ C09D 11/34 106/31.29 |
| 2004/0002580 A1* | 1/2004 | Newman et al. ............ 528/354 |
| 2005/0005819 A1* | 1/2005 | Huinck ............ 106/31.29 |
| 2008/0111110 A1* | 5/2008 | Ma et al. ............ 252/500 |

(Continued)

OTHER PUBLICATIONS

Pearce et al., "Imaging of Melting and Crystallization of Poly (ehthylene oxide) in Real-Time by Hot-Stage Atomic Force Microscopy", American Chemical Society, Macromolecules 1997, vol. 30, pp. 5843-5848.*

(Continued)

*Primary Examiner* — Sath V Perungavoor
*Assistant Examiner* — Dakshesh Parikh
(74) *Attorney, Agent, or Firm* — Pillsbury Winthrop Shaw Pittman LLP

(57) ABSTRACT

A system is disclosed for measuring the crystallization of crystalline-amorphous mixtures. The system includes a sample holder. and a heating apparatus to melt a ink composition and to keep the melted ink composition at a first specified temperature for a first period of time. The system includes a cooling apparatus to receive the melted ink composition, to cool the melted ink composition and to maintain the cooled ink composition at a second specified temperature. The system includes a microscope and a video recording device to capture images of the cooled ink composition for a second period of time A video processing computer includes a memory, a processor and software instructions and the software instructions causes the computer to extract crystallization parameters about the cooled ink composition from the captured images. The crystallization parameters identify fast solidifying crystalline inks that have a short time duration from onset of crystallization until crystallization.

16 Claims, 8 Drawing Sheets

(56) References Cited

U.S. PATENT DOCUMENTS

| | | | |
|---|---|---|---|
| 2008/0247627 A1* | 10/2008 | Matsuzaki | 382/133 |
| 2009/0020617 A1* | 1/2009 | Kwon et al. | 235/494 |
| 2010/0110541 A1* | 5/2010 | Angros | 359/397 |
| 2010/0128960 A1* | 5/2010 | Yumikake | 382/133 |
| 2011/0152108 A1* | 6/2011 | Brenan et al. | 506/7 |
| 2011/0212824 A1* | 9/2011 | Almoric et al. | 501/32 |

OTHER PUBLICATIONS

Leitao et al., "Phase transitions of 1,2-cyclohexanediol isomers studied by polarized light microscopy and differential thermal analysis", Thermochimica Acta, vol. 378, 2001, pp. 117-124.*

U.S. Appl. No. 13/457,323, filed Apr. 26, 2012, Kentaro Morimitsu.
U.S. Appl. No. 13/457,300, filed Apr. 26, 2012, Kentaro Morimitsu.
U.S. Appl. No. 13/457,271, filed Apr. 26, 2012, Gabriel Iftime.
U.S. Appl. No. 13/457,221, filed Apr. 26, 2012, Kentaro Morimitsu.
U.S. Appl. No. 13/457,157, filed Apr. 26, 2012, Gabriel Iftime.
U.S. Appl. No. 13/457,068, filed Apr. 26, 2012, Neveen Chopra.
U.S. Appl. No. 13/456,993, filed Apr. 26, 2012, Daryl W. Vanbesien.
U.S. Appl. No. 13/456,916, filed Apr. 26, 2012, Kentaro Morimitsu.
U.S. Appl. No. 13/456,805, filed Apr. 26, 2012, Jennifer L. Belelie.
U.S. Appl. No. 13/456,722, filed Apr. 26, 2012, Gabriel Iftime.
U.S. Appl. No. 13/456,679, filed Apr. 26, 2012, Jennifer L. Belelie.
U.S. Appl. No. 13/456,619, filed Apr. 26, 2012, Naveen Chopra.

* cited by examiner

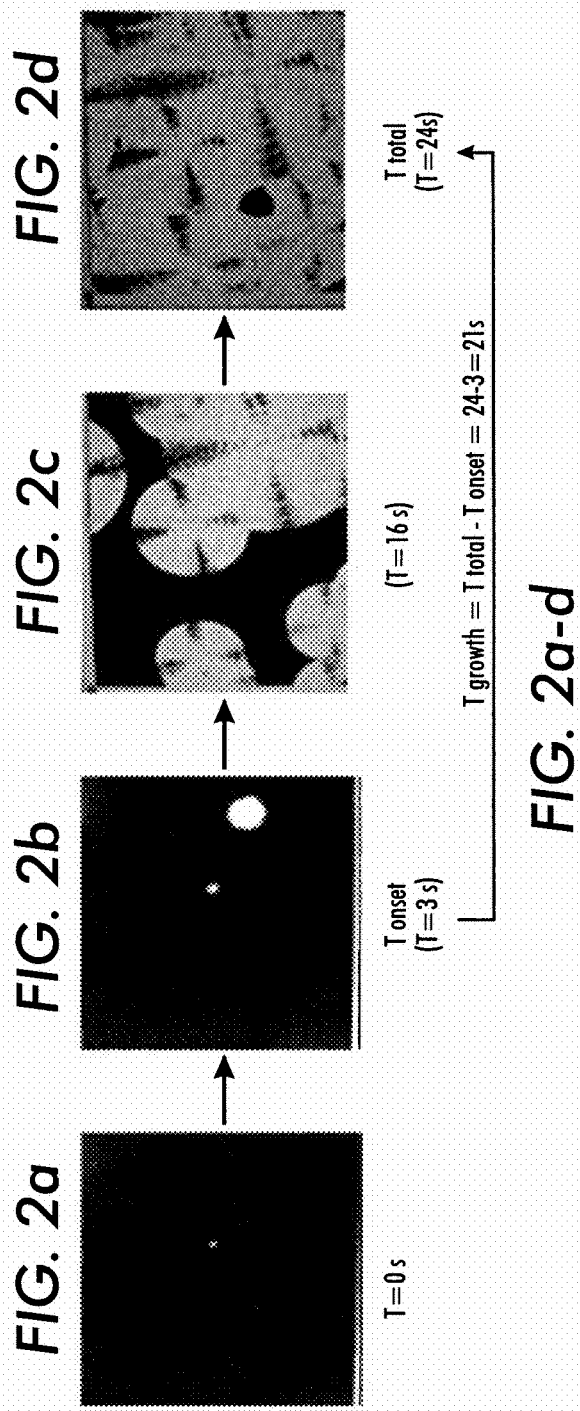

TIME RESOLVED OPTICAL MICROSCOPY ("TROM") PROCESS FOR MEASURING THE RATE OF CRYSTALLIZATION OF SOLID INKS

CROSS-REFERENCE TO RELATED APPLICATIONS

Reference is made to commonly owned and co-pending, U.S. patent application Ser. No. 13/456,619 entitled "Phase Change Ink Compositions Comprising Crystalline Diurethanes And Derivatives Thereof" to Naveen Chopra et al., electronically filed on the same day herewith; U.S. patent application Ser. No. 13/457,157 entitled "Fast Crystallizing crystalline-amorphous ink compositions and method for making the same" to Gabriel Iftime et al., electronically filed on the same day herewith; U.S. patent application Ser. No. 13/457,323 entitled "Phase change ink Compositions Comprising Crystalline Sulfone Compounds and Derivatives Thereof" to Kentaro Morimitsu et al., electronically filed on the same day herewith; U.S. patent application Ser. No. 13/457,221 entitled "Phase Change Inks Comprising Crystalline Amides" to Kentaro Morimitsu et al., electronically filed on the same day herewith; U.S. patent application Ser. No. 13/546,916 entitled "Phase Change Ink Compositions Comprising Aromatic Ethers" to Kentaro Morimitsu et al., electronically filed on the same day herewith; U.S. patent application Ser. No. 13/457,271 entitled "Rapid Solidifying Crystalline-Amorphous Inks" to Gabriel Iftime et al., electronically filed on the same day herewith; U.S. patent application Ser. No. 13/456,993 entitled "Phase Change Inks Comprising Inorganic Nucleating Agents" to Daryl W. Vanbesien et al., electronically filed on the same day herewith; U.S. patent application Ser. No. 13/456,722 entitled "Phase Change Inks Comprising Fatty Acids" to Gabriel Iftime et al., electronically filed on the same day herewith; U.S. patent application Ser. No. 13/457,300 entitled "Phase Change Inks Comprising Aromatic Diester Crystalline Compounds" to Kentaro Morimitsu et al., electronically filed on the same day herewith; U.S. patent application Ser. No. 13/457,068 entitled "Phase Change Ink Compositions Comprising Diurethanes as Amorphous Materials" to Naveen Chopra et al., electronically filed on the same day herewith; U.S. patent application Ser. No. 13/456,805 entitled "Phase Change Inks Comprising Organic Pigments" to Jennifer Belelie et al., electronically filed on the same day herewith; U.S. patent application Ser. No. 13/456,679 entitled "Rapidly Crystallizing Phase Change Inks and Methods for Forming the Same "to Jennifer Belelie et al., electronically filed on the same day herewith; the entire disclosures of which are incorporated herein by reference in its entirety.

BACKGROUND

The present embodiments relate to a technique which measures the rate of solidification of crystalline/amorphous inks. The crystalline/amorphous inks are phase change ink compositions characterized by being solid at room temperature (e.g., 20-27° C.) and molten at an elevated temperature at which the molten ink is applied to a substrate. These phase change ink compositions can be used for ink jet printing. The present embodiments are directed to a novel application of a known TROM technique to identify a novel way of testing new ink compositions to make sure they are fast solidifying, which is illustrated by a rapidly solidifying phase change ink composition.

A key requirement for inks in the production environment is high speed printing in a Direct to Paper (DTP) architecture. Suitable inks are made of an ink base that is comprised of amorphous and crystalline components with additives like colorants. Fast printing requires the ink to solidify quickly, which translates into a requirement for fast crystallization. In order to design fast crystallization, ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by a heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

In general, phase change inks (sometimes referred to as "hot melt inks") are in solid phase at ambient temperatures, but exist in liquid phase at elevated operating temperature of an ink jet printing device. At the jetting temperature, droplets of liquid ink are ejected from the printing device, and when liquid droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components. There is a further need for printing these inks at high speeds as required by digital presses in production environment.

Fast printing requires that the inks solidify quickly and this translates into a requirement for fast crystallization. In order to develop fast crystallizing inks, it is necessary to develop efficient methods to measure the rate of crystallization.

Currently, there are two available method for determining suitability of an ink for high speed printing. The first is to actually print the test ink with the intended printer, at the desired speed and test whether there is any visible ink transferred on the next page. If this is the case, the ink solidified too slowly and is not suitable. A fast crystallizing ink would not offset on the next page when printed at the desired speed. This approach requires using of significant amounts of inks for testing and therefore it is expensive and time consuming. There is a need to develop a method to characterize the rate of crystallization of crystalline-amorphous ink which uses very small amounts of materials (i.e., less than 1 gram) and which could be performed in short time in order to enable fast and cost effective screening of inks. The second method consists of K-proofing the inks. This method has several disadvantages. One disadvantage is that there is at least a few seconds delay between producing the K-proof and then testing the solidification of the ink on the print. Thus, the method does not offer information to distinguish between the desirable links which crystallize within 5 seconds of printing.

Polarized Optical Microscopy ("POM") was previously utilized to view crystallization of crystalline polymers. For example, in Andjelic' S, Jamiolkowski D D, McDivitt J, Fischer J, Zhou J. J Polym Sci, Polym Phys Ed 2001; 39:3073, optical microscopy was performed with a Nikon SHZ-U optical microscope in conjunction with a Micron i308 low light integrating camera and all observations were viewed through crossed polarizations. The polymer sample was held in the Linkam shear stage, providing precise temperature and shear control. All images were captured at a 6 times magnification, and a scale bar is shown in the microscopy figures. For enhancement in appearance for publication, all optical microscopy images have been contrast-inverted; dark fields are light and vice versa. In addition, in an article entitled "Crystallization Behavior of Poly(ethylene oxide) in the Presence of Na+ Montmorillonite Fillers," by K. E. Strawhecker and E. Manias, Jan. 25, 2003 (American Chemical Society., the authors utilized an Olympus BH-2 Optical Microscope, equipped with a Mettler hot stage (RT-300° C.) and a video camera connected to a VCR. The crystallization behaviour of all systems was recorded in real-time video to be utilized in later analysis of crystallization shapes and formation. In these examples, crystalline or semi-crystalline polymer samples were held on the heating/cooling stage at all times in order to achieve very high temperature control. In addition, samples were cooled at low rate such as 0.25 to 10° C. per minute.

Accordingly, there is a need for a method which enables quick screening of a test ink batches without the need to scale-up ink formulations to 100 s of grams or kilograms of ink. Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY OF THE INVENTION

In a present embodiment, a system for measuring the crystallization of crystalline-amorphous mixtures includes a sample, a sample holder, a heating apparatus, a cooling apparatus, a microscope, a video recording device and a computer. The sample ink composition is sandwiched between transparent substrates which form the sample holder. The heating apparatus melts the sandwiched ink composition and to keep the melted ink composition at a first specified temperature for a first period of time. The cooling apparatus receives the melted ink composition, cools the melted ink composition and maintains the cooled ink composition at a second specified temperature. The microscope and the video recording device to capture images of the cooled ink utilizing time resolved optical microscopy. The computer includes a memory, processor and software instructions. The memory stores the captured images and the software instructions, when executed by the processor, cause the computer to extract crystallization parameters about the cooled ink composition from the captured images. The crystallization parameters are utilized to identify fast solidifying inks.

In further embodiments, a method of measuring crystallization rates of ink samples includes placing an ink sample between two glass slides and heating the ink sample until the ink sample has a specified viscosity. The method further includes transferring the heated ink sample to a cooling apparatus and cooling the heated ink sample to a predetermined temperature and then placing the cooled ink sample under a polarized optical microscope for magnification of viewing of the cooled ink sample. The method further includes coupling a camera to the polarized optical microscope to capture images of the magnified cooled ink sample.

The method of measuring crystallization also includes storing the captured images of the magnified cooled ink sample and extracting crystallization data from the images of the magnified cooled ink sample. The crystallization data includes a time when the first crystal appears, a duration of time from the time when the first crystal appears to completion of the crystallization and a time from when the cooled ink sample is placed on the cooling apparatus to an end of crystallization. This method identifies ink samples that are quick solidifying and beneficial for use in a high speed printing environment.

In an alternative embodiment, a video-processing computer includes instructions stored in a memory, which when executed causes the video-processing computer to receive a video frame of an analyzed ink sample, perform image processing on the received video frame and calculate a total crystalline area of the ink sample in the received video frame. The video processing computer counts a number of crystals in the ink sample in the received video frame, and calculates an average crystal size of the ink sample in the received video frame. The video processing computer performs the above steps for each of the video frames for the analyzed ink sample. The video processing computer receives the calculated data, generates a graph of a crystalline area coverage for a measured time frame, generates a graph of a number of crystals for the measured time frame, and generates a graph of an average crystal size for the measured time frame. The video processing computer program identifies fast solidifying inks for use in high speed printing environments.

BRIEF DESCRIPTION OF THE DRAWINGS

For a better understanding of the present embodiments, reference may be had to the accompanying figures.

FIGS. 2a-2d illustrate the different stages within the ink sample as viewed through the polarized optical microscope according to an embodiment of the invention.

DETAILED DESCRIPTION

Figure 1A:
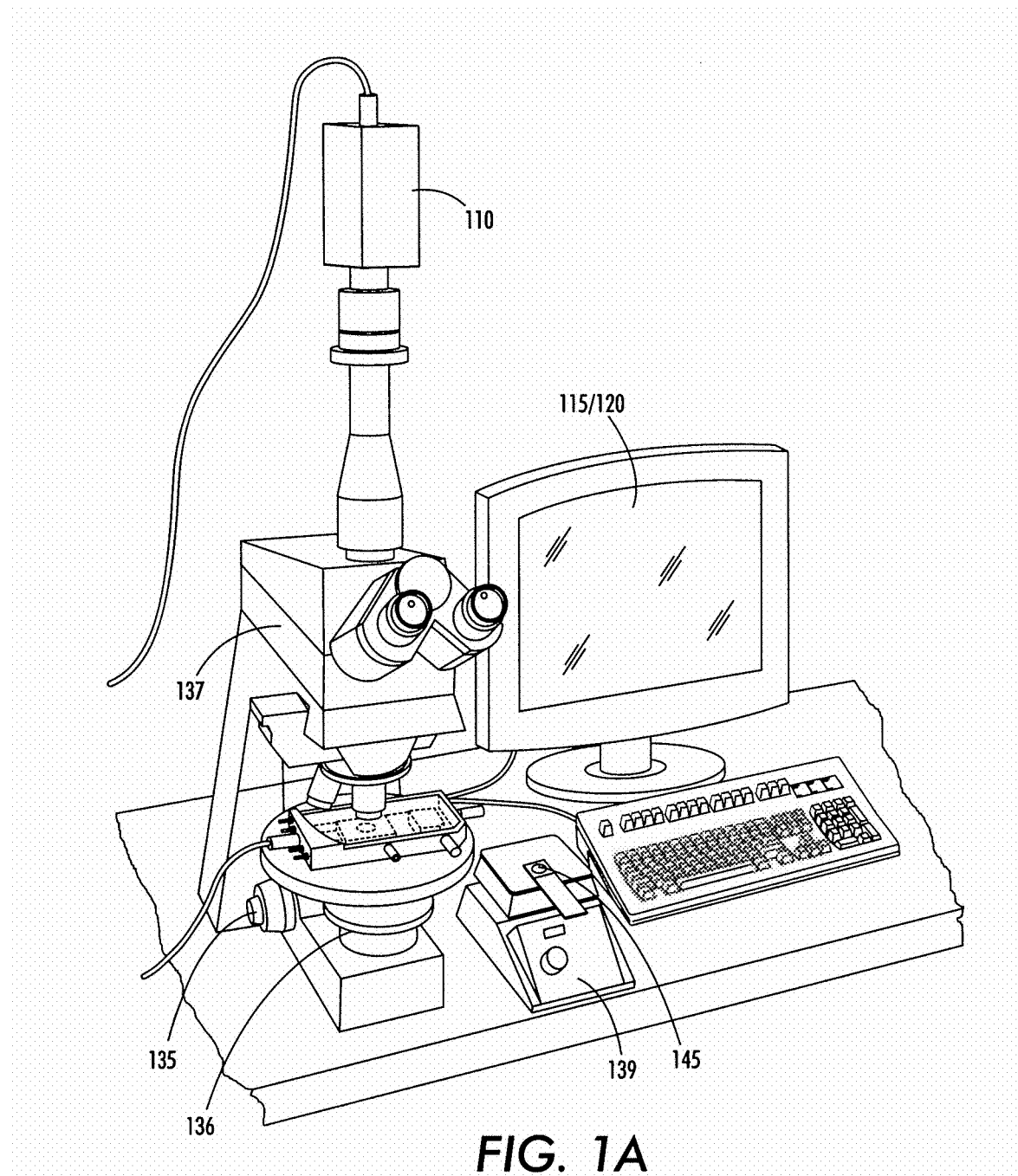
FIG. 1a represents a drawing illustrating the experimental set-up for measuring the rate of crystallization by using the Time-Resolved Optical Microscopy (TROM) technique according to an embodiment of the disclosure.

In the following description, it is understood that other embodiments may be utilized and structural and operational changes may be made without departure from the scope of the present embodiments disclosed herein.

Unlike the prior art, the TROM process of the present invention is specifically designed to achieve the fast cooling rate experienced by an ink droplet when ejected from the print-head nozzles. TROM measures the rate of crystallization of inks, in conditions as close as possible to high speed printing, i.e. meltable compositions suitable for high speed inkjet printing. High cooling rate of ink samples is achieved in TROM process by transferring the sample from the melt state onto the cooling stage by using a sample holder which keeps the sample melt at all times until transferred. As such a cooling rate for the sample can be estimated at several 1000's ° C./min. This cooling rate is many orders of magnitude faster than prior art. The inventors have found that fast crystallization of a composition made of a crystalline and an amorphous component is not an inherent property of the composition. The rate of crystallization of the crystalline-amorphous mixture is a function of not only of the crystalline and amorphous components independently, but even more importantly is influenced by the selection of the pair of crystalline and amorphous materials. For example, a given crystalline component may be providing a fast crystallizing composition when mixed with one amorphous component but the same crystalline component can result in a slow crystallizing composition when mixed with a different amorphous component. The relationship between the chemical structures of the pair of crystalline and amorphous components controls the rate of crystallization of a given mixture. However, there is no prior art describing how to choose the pair of crystalline and amorphous component such as to provide fast crystallizing inks. Methods for providing fast crystallizing crystalline-amorphous inks are not obvious. The method disclosed in the present invention enables fast screening of test inks prior to printing, therefore ensures that ink development team never scale-up to larger amounts inks which would be too slow to solidify. The method disclosed here saves time and resources, speeding up the ink development process.

Various approaches and design rules to fast crystallizing inks have been developed and their crystallization performance was demonstrated by the method disclosed in the present invention. Such fast crystallizing inks are disclosed in the co-pending applications.

As mentioned before, the rate of crystallization is a function not only of the crystalline material itself but also of the amorphous material selected as a pair to form the crystallizing composition. The crystalline component itself, i.e. without the amorphous component, could be slow or fast crystallizing. The mixture of crystalline and amorphous components could be also slow or fast crystallizing.

In order to evaluate the suitability of a test ink for fast printing a quantitative method for measuring the rates of crystallization of solid inks containing crystalline components was developed. A TROM (Time-Resolved Optical Microscopy) process compares various test samples and, as a result, is a useful tool for monitoring progress made with respect to the design of fast crystallizing inks. The TROM process monitors the appearance and the growth of crystals by using Polarized Optical Microscopy (POM).

Figure 1B:
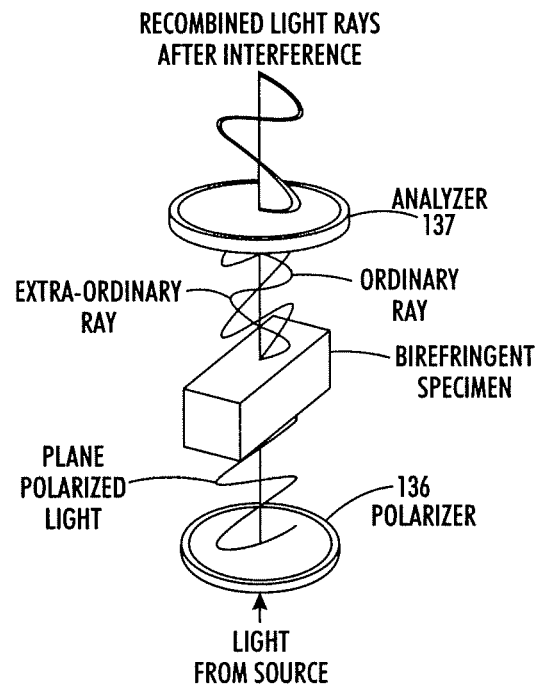
FIG. 1b illustrates the polarized optical microscopy configuration according to an embodiment of the invention.
Figure 1C:
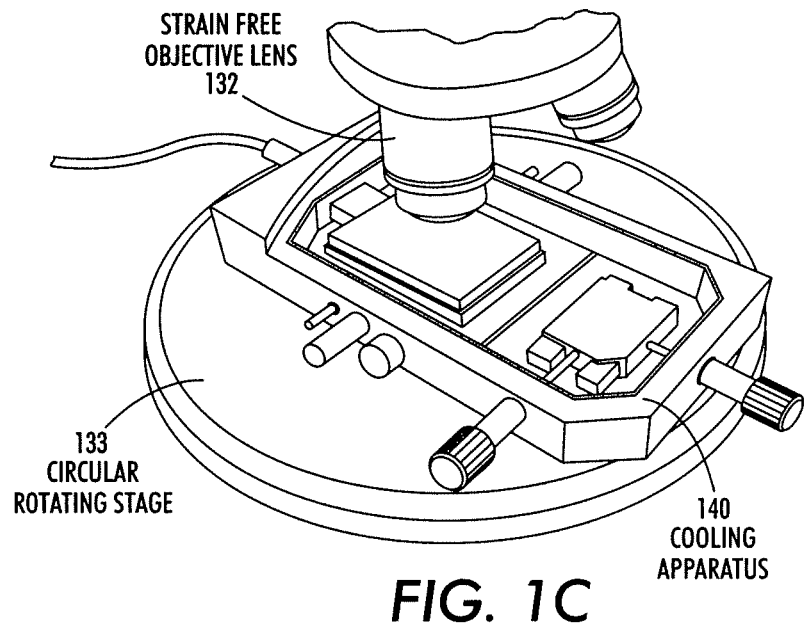
FIG. 1c shows the ink sample in between circular glass substrates placed on the cooling apparatus 140 and onto the circular rotating stage 133, in the path of the polarized light.
Figure 1D:
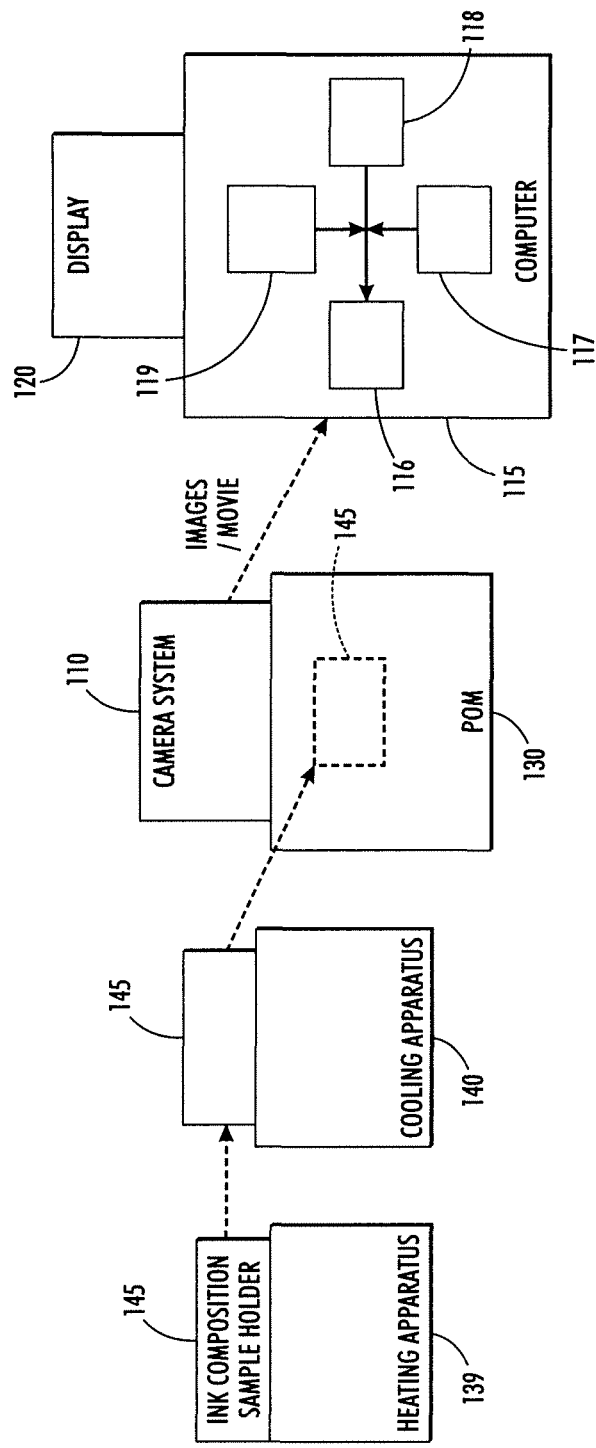
FIG. 1d illustrates a dataflow diagram and system diagram of the TROM process according to an embodiment of the invention.

FIGS. 1a-1c are drawings illustrating an experimental set-up for measuring the rate of crystallization by using the Time-Resolved Optical Microscopy (TROM) process according to an embodiment of the disclosure. The equipment utilized in the TROM process includes a camera system 110, a polarized optical microscope (POM) 130, and a sample holder 145. The POM may include, a strain-free objective lens 132 (or a plurality of these lenses), a circulating rotating stage 133, a focus apparatus 135, a polarizer 136 and an analyzer 137. The analyzer is the second polarizer which is oriented perpendicular to the first polarizer. FIG. 1b illustrates the polarized optical microscopy configuration while FIG. 1c shows the ink sample in between circular glass substrates placed on the cooling apparatus 140 and onto the circular rotating stage 133, in the path of the polarized light. FIG. 1d illustrates a flow of a sample and the flow of information about the sample according to an embodiment of the invention. The equipment utilized in the TROM process also includes a computer 115, a display 120, the POM 130, a heating control apparatus 139, a cooling/heating control apparatus 140, and a sample holder 145. The computer 115 includes memory 116, a processor 117, and a non-transitory storage medium 118 (a hard drive, flash ROM, optical drive, USB drive). The TROM Process software 119 is stored on the non-transitory storage medium 118 and when the software is executed by the processor and loaded into memory, it causes the computer to perform actions. In the present invention, the TROM Process software processes the movie (or images created by the camera system)

and extracts key information from frames of the movie (e.g., time of crystallization and onset of crystallization).

Figure 1E:
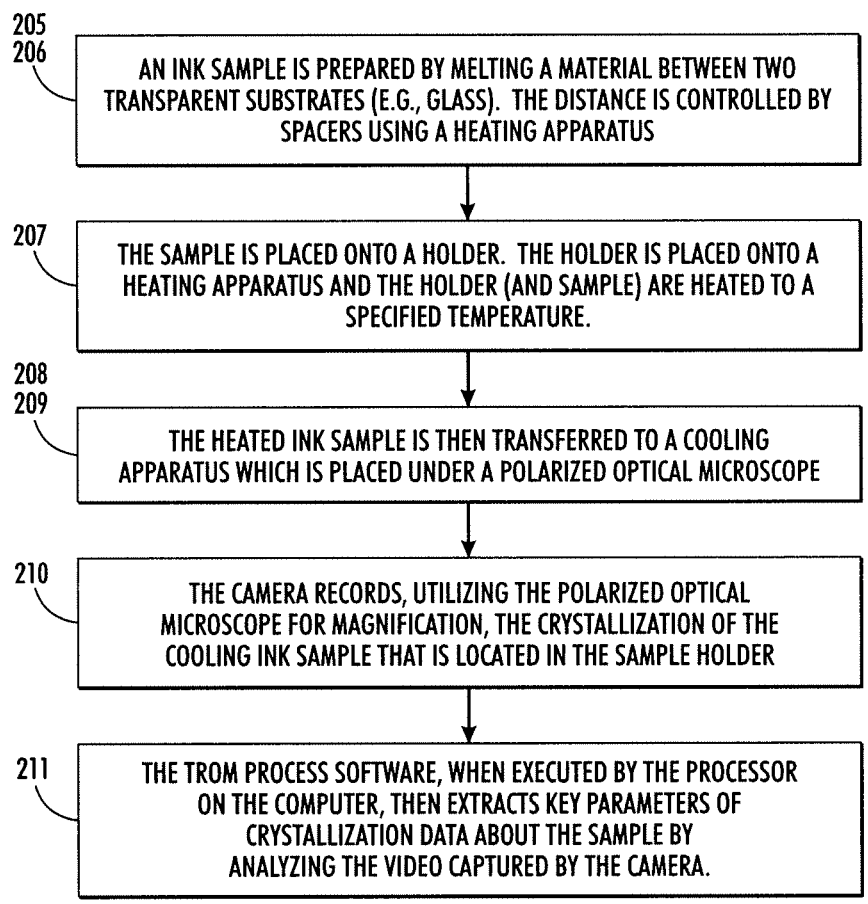
FIG. 1e illustrates a flowchart of the TROM process according to an embodiment of the invention.

FIG. 1e illustrates a flowchart of the TROM process according to an embodiment of the invention. An ink sample is prepared by melting 205 a material (e.g., ink) using a heating apparatus-139. The melted sample is placed 206 between two transparent substrates. In embodiments of the invention, the thickness of the sample is controlled by spacers placed between the two transparent substrates. The spacers may be made of fiberglass and may create a space (and thus sample thickness) of 5-25 microns.

In one embodiment, the transparent substrates are made on isotropic material. Typically these are non-crystalline polymeric materials. Suitable isotropic materials include amorphous polymeric materials, like for example polymethylmethacrylate and polystyrene. Other suitable isotropic substrates include glass slides.

The transparent substrate may also be a birefringent material, for example a material having a linear birefringence. Typical examples of this type of material include Polyethyleneterephthalate (PET) which typically shows one direction of linear birefringence. However, in this case, the substrates need to be aligned during the measurement in a parallel manner to the two polarizers of the polarized optical microscope 130 in order to cancel their birefringence. If this is not done, then the birefringence of the substrate is too strong and therefore decreases the contrast detectable between the crystalline materials in the ink and the amorphous regions.

The glass slides should be as thin and as small as possible so that the cooling is controlled by the cooling stage and the cooling slowdown due to glass slides cooling is minimized. Illustratively, in an embodiment of the invention, the ink sample may be sandwiched between 18 mm circular thin glass slides of a thickness of 0.20 and 0.50 mm. The thickness of the ink sample is kept in a range 5-25 μm (controlled with fiberglass spacers) which is close to actual printed ink layers.

The sample from 205 consisting of ink sandwiched between transparent substrates is placed onto the sample holder 145 which is placed onto the heating apparatus 139. The heating apparatus-139 heats 207 the ink sample to a specified temperature. In embodiments of the invention, the desired temperature is the ink jetting temperature. This may be the temperature at which the ink sample has a viscosity of about 10-12 cps. The heating apparatus-139 heats the sample for a specified time to ensure the ink sample reaches equilibrium in the melted state. For example, the sample may be heated to the expected jetting temperature (viscosity=10-12 cps) via an offline hotplate. As an illustrative example, suitable phase change inks usually are designed to have a viscosity of about 11 cps at about 100° C. to about 140° C. Other melting temperatures are suitable too, for example a melting temperature comprised in a range from 80° C. to 400° C. This temperature range is useful for compositions containing high melting temperature polymeric materials which typically melt at temperatures no higher than 400° C. The composition can be used for printing, therefore named "an ink" or any other meltable composition which could be used for other application not related to printing.

The heated ink sample (which may be in a molten state) is then transferred 208 to a cooling apparatus-140. In an embodiment of the invention, the heating and cooling apparatus may be a single device with temperature controls to change the applied temperature. The timeframe in which the heated ink sample is placed on the cooling apparatus may be referred to as a cooling stage. In the cooling stage, the heated (molten) sample is maintained at a specified temperature. Comparing the rate of crystallization of different ink samples requires testing at the same cooling temperature. It is understood that when the cooling temperature is changed, the same ink will measure a different rate of crystallization. For example, when the ink is cooled to 40° C. it may crystallize faster than the same ink cooled to a higher temperature, for example 60° C.

Illustratively, this temperature may be set to be a temperature that a drum or a paper substrate maintains during a printing process (when the drum or paper is being printed upon). For example, a temperature of 40° C. matches the temperature of the paper substrate and is generally preferred for comparing the tendency of crystallization of different inks. As an example, the cooling stage (e.g., a preset temperature) may be maintained by a controlled supply of heat and liquid nitrogen (e.g., a liquid nitrogen pump and tank). In an embodiment of the invention, the cooling apparatus 140 including the sample holder 145 and ink sample is placed 209 under a polarized optical microscope 130. In an embodiment of the invention, the cooled sample is placed 209 under the polarized microscope 130. The camera system 110 is coupled to a polarized optimal microscope 130 in order to magnify the ink sample image that the camera is capturing. The camera system 110 records 210, utilizing the polarized optical microscope 130 for magnification, the crystallization of the cooled ink sample that is located in the sample holder. For example, the camera system 110 may be set to capture two minutes of video or images for the cooled ink sample located in the sample holder. The camera system 110 records and monitors the appearance and time evolution of crystallization. The camera system 110 generates a movie file or a series of images (e.g., captured images) which are transferred or transmitted to the computer 115 and then stored in non-transitory storage medium 118.

The TROM process software 119, when executed by the processor 117 on the computer 115, then extracts 211 key parameters of crystallization data about the sample by analyzing the video captured by the camera system.

FIGS. 2a-2d illustrate the different stages within the ink sample as viewed through the polarized optical microscope. FIGS. 2a-2d highlight the key steps in the measuring process with the mainline ink base which contains amorphous and crystalline components (and no dye or pigment). In embodiments of the invention, the crystals appear as bright areas on a black background.

In order to obtain data that allows comparison between different and various samples, standardized TROM experimental conditions were set, with the goal of including as many parameters relevant to the actual printing process.

The key set parameters include:
(a) glass slides of a 16-25 mm diameter and a thickness comprised in between 0.20 and 0.50 mm;
(b) ink sample thickness comprised in a range from 5 to 25 microns;
(c) cooling temperature set at 40° C.

Crystalline materials are visible utilizing the TROM process because they are birefringent. In other words, crystalline materials rotate the plane of linearly polarized light. The subfigure 1a-b illustrates the rotation of the plane of linearly polarized light by a birefringent specimen. When viewed under the POM 130, the molten ink sample of crystalline-amorphous inks, at time zero, appears black as no light is passed through. As the sample crystallizes, the crystalline areas in the ink sample appear brighter. Thus, the POM 130 enables an image contrast when viewing crystalline components and allows for pursuing crystallization kinetics of crystalline-amorphous inks when cooled from the molten state to a set-temperature. This method is suitable as long as crystalline domains are formed during crystallization. This method is suitable for crystalline-amorphous compositions including 100% crystalline component. It is not suitable if the material is 100% amorphous in the cooled state since in this case the examined sample appears as just a black color because no birefringent (crystals) domains are formed.

The numbers reported by the TROM process include: the time from the first crystal (crystallization onset) to the last (crystallization completion).

The definition of key measured parameters of the TROM process are set forth below:

Time zero (T=0 s)=the molten sample is placed on the cooling stage under microscope $T_{onset}$=the time when the first crystal appears $T_{growth}$=the duration of the crystal growth from the first crystal (T onset) to the completion of the crystallization (T total)

$$T_{total}=T_{onset}+T_{growth}$$

It should be understood that the crystallization times obtained with the TROM process for selected inks are not identical to what would be the crystallization times of a droplet of ink in an actual printing device. In the actual printing device such as a printer, the ink solidifies much faster. Through testing of various ink samples or compositions, it has been determined that there is a good correlation between the total crystallization time as measured by the TROM process and the solidification time of an ink in a printer. In the standardized conditions described above, it is also determined that inks that solidify within 20 seconds, within 15 seconds, or within 10 seconds (i.e., Total crystallization time <20 s, <15 s or <10 s), as measured by the TROM process, are suitable for fast printing, typically at speeds from 100 feet/minute or higher. Therefore, for the purpose of the present disclosure, a rate of crystallization lower than 15 seconds is considered to be fast crystallizing.

In order to evaluate reliability and reproducibility of the TROM process, tests on multiple ink samples were performed. The range of interest was for ink samples which crystallize in 30 seconds or less when evaluated by the TROM process. After testing via a high speed printing fixture, the inventors had determined that ink samples crystallizing in 30 seconds were too slow for high speed ink jet printing.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Crystalline Components

The crystalline TROM samples were prepared according to the procedure described in the disclosure. The crystallization rates of the crystalline materials were measured and the results are shown in Tables 1-5.

Table 1 illustrates rate of crystallization measured for various pure crystalline components (100% crystalline)

TABLE 1

TROM results of pure crystalline compounds

| # | Compound | Structure | T test (° C.) | T onset (s) | T growth (s) | T total (s) |
|---|---|---|---|---|---|---|
| 1 | Diphenyl sulfone, DPS (purchased from TCl) | | 132 | 2 | 1 | 3 |
| 2 | bis(4-methoxyphenyl) octanedioate | | 119 | 2 | 1 | 3 |
| 3 | di-p-tolyl octanedioate | | 85 | 3 | 2 | 5 |
| 4 | Diphenethyl L-Tartrate, DPT | | 112 | 2 | 1 | 3 |

TABLE 1-continued

TROM results of pure crystalline compounds

| # | Compound | Structure | T test (° C.) | T onset (s) | T growth (s) | T total (s) |
|---|---|---|---|---|---|---|
| 5 | dibenzyl hexane-1,6-diyldicarbamate | | 127 | 2 | 3 | 5 |
| 6 | N¹,N²,N³-tributyl-2-hydroxypropane-1,2,3-tricarboxamide | | 108 | 12 | 7 | 19 |

Table 2 illustrates rate of crystallization measured for fast crystallizing compositions. For the purpose of fast printing applications, a fast crystallizing ink is defined in the context of the present invention as an ink having a rate of crystallization by TROM standardized measuring conditions of less than 15 seconds.

TABLE 2

TROM results of fast crystallizing compositions made of crystalline and amorphous components.
Percentages are by weight.

| # | Crystalline (%) | Amorphous (%) | T test (° C.) | T onset (s) | T growth (s) | T total (s) |
|---|---|---|---|---|---|---|
| 7 | Diphenyl sulfone (DPS) (80) | TMC (20) | 130 | 2.5 | 2.0 | 4.5 |
| 8 | dibenzyl hexane-1,6-diyldicarbamate (70) | DMT (30) | 120 | 2 | 10 | 12 |
| 9 | di-p-tolyl octanedioate (80) | DMT (20) | 80; 100; 120; 140; | ~4 | ~3 | ~7 |

TABLE 2-continued

TROM results of fast crystallizing compositions made of crystalline and amorphous components. Percentages are by weight.

| # | Crystalline (%) | Amorphous (%) | T test (° C.) | T on-set (s) | T growth (s) | T to-tal (s) |
|---|---|---|---|---|---|---|
| 10 | 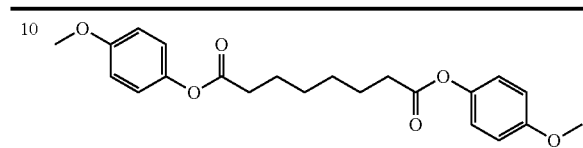 bis(4-methoxyphenyl) octanedioate (80) | 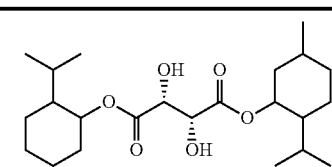 DMT (20) | 120; 140 | ~4 | ~3 | ~7 |

Table 3 illustrates rates of crystallization measured for slow crystallizing crystalline-amorphous compositions.

TABLE 3

TROM data for slow crystallizing crystalline/amorphous compositions.

| # | Crystalline (%) | Amorphous (%) | T test (° C.) | T on-set (s) | T growth (s) | T to-tal (s) |
|---|---|---|---|---|---|---|
| 11 | 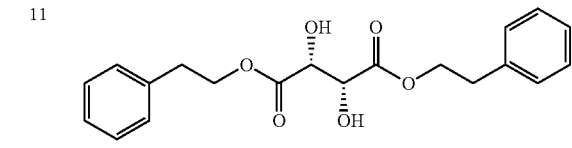 DPT (80) | 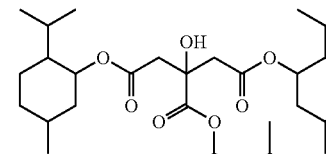 TMC (20) | 120 | 25 | 150 | 175 |
| 12 | 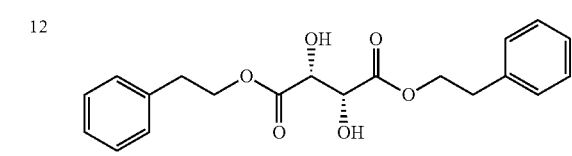 DPT (80) | 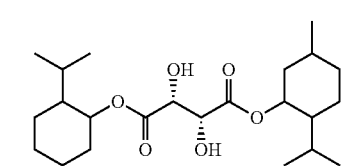 DMT (20) | 115 | 3 | 17-25 | 24 |
| 13 | 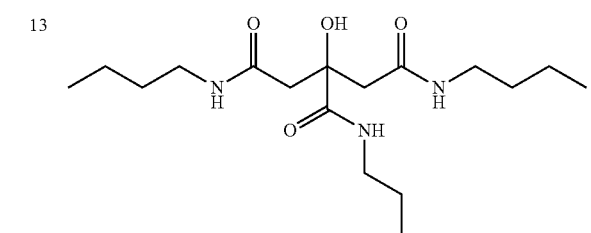 $N^1,N^2,N^3$-tributyl-2-hydroxypropane-1,2,3-tricarboxamide (70) | 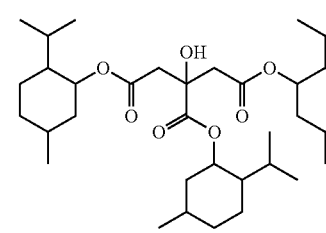 TMC (30) | 115 | 110 | 200 | 310 |

Table 4 shows examples of inks compositions which crystallize slowly, i.e. $T_{total}$>15 seconds. They contain crystalline, amorphous and dye components.

TABLE 4

TROM data for slow crystallizing inks made of crystalline/amorphous components and dyes.

| Ink # | Ink details | T test (° C.) | Tonset (s) | Tgrowth (s) | T total (s) |
|---|---|---|---|---|---|
| 14 | DPT/DMT = 80/20 SB101 (1%) (Blue dye ink) | 115 | 8 | 99 | 107 |
| 15 | DPT/DMT = 80/20 SB 67 (2%) (Blue dye ink) | 120 | 61 | 220 | 281 |
| 16 | DPT/DMT = 80/20 DR 60 (2%) (Red dye ink) | 120 | 5 | 60 | 65 |

Table 5 shows the results for fast crystallizing ink compositions, containing crystalline, amorphous components and dyes, as well as Xerox proprietary ink currently commercially available with ColorCube Printer.

TABLE 5

TROM data for fast crystallizing inks.

| Ink # | Ink details | T test (° C.) | Tonset (s) | Tgrowth (s) | T total (s) |
|---|---|---|---|---|---|
| 17 | Base: bis(4-methoxyphenyl)octane-dioate/DMT (80/20) Dye: Orasol Blue GN (3%) | 125 | 5 | 3 | 8 |
| 18 | Base: DPS/TMC (80/20) Dye: SB101 (2%) | 130 | 3 | 2 | 5 |
| 19 | Base: dibenzyl hexane-1,6-diyldicarbamate/DMT (70/30) Dye: SB101 (2%) | 120 | 2 | 9 | 11 |
| 20 | Base: dibenzyl hexane-1,6-diyldicarbamate/ DMT = 80/20: (96%) Pigment: B4G cyan (2%); SOLSPERSE 32000, (2%) | 130 | 2 | 2 | 4 |
| 21 | Commercial Xerox phase change Ink | 120 | 2 | 2 | 4 |

Over 100 different inks of different compositions have been measured using the TROM process to identify rate of crystallization. The TROM process usefulness is that it will minimize the amount of ink compositions that go through full scale-up. In other words, the TROM process identifies inks that have fast crystallization and thus are candidates for further testing (where more ink is needed to complete the case). The TROM process as initially developed reported a total time of crystallization of the ink sample. However, the ink sample may not need to be 100% crystallized to exhibit acceptable offset performance. For example, an ink sample may be sufficiently robust for use (i.e., there is no offset when printed at a high speed) at 90% crystallization. This may also be important because in some printing systems, the last 10% of crystalline growth process is very slow compared to the original 90%. Thus, under these circumstances, total time of crystallization reported for the TROM process as described above may overestimate the crystallization time required for no offset of the ink sample at a given print speed.

By utilizing video processing, the TROM process has been further improved to provide data closer to an actual printing process (where a % of crystallization is sufficient) to evaluate the ink sample and its use in high speed printer. Although the % of crystallization may vary between types of ink samples (and printing devices), extracting data to and calculating rates of crystallization to the identified acceptable crystallization percentage improves the TROM process. In other words, if it is found that 85% crystallization is a sufficient crystallization percentage to identify ink samples that are fast drying and able to be used in high speed printing (and thus should be scaled up for further testing), then having the TROM video processing to identify this timeframe would be beneficial.

Figure 3:
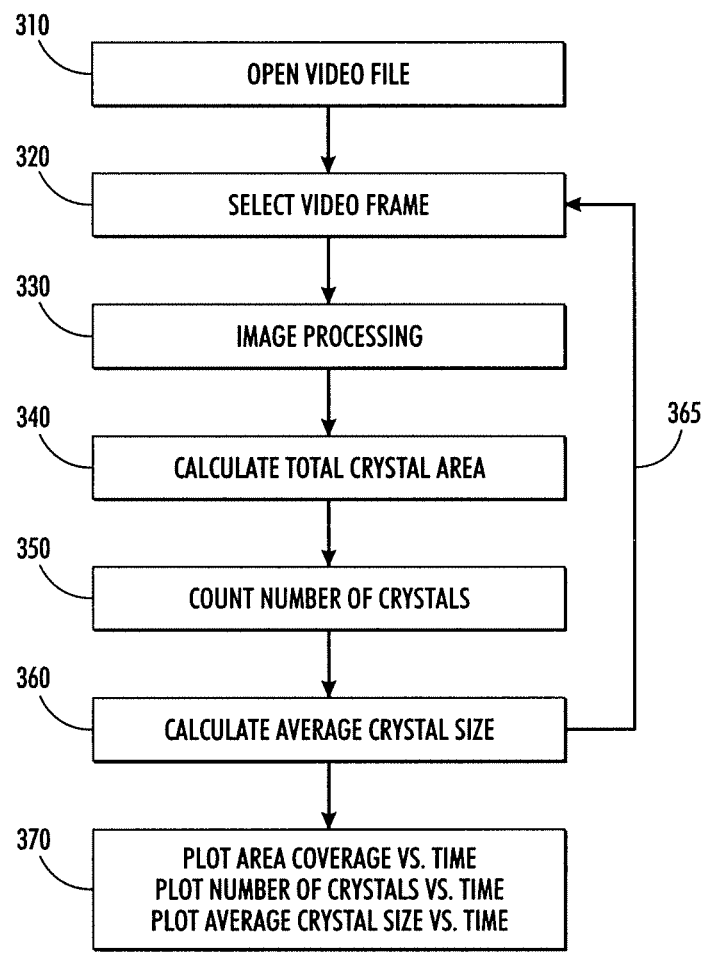
FIG. 3 is a flowchart of a method of video processing TROM recordings according to an embodiment of the disclosure.

FIG. 3 illustrates a computer-implemented video processing method of TROM processing according to an embodiment of the invention.

In an embodiment of the invention, a video file is opened 310 by a media player or other software application. The TROM evaluation process analyzes each ink sample video frame-by-frame. The TROM evaluation process identifies a crystal defined by a region that has a large contrast from its background to separate from its neighbors. The TROM evaluation process receives 320 a video frame. The TROM evaluation process performs 330 image processing on the received frame. Each frame has a time identification. The image processing identifies areas of crystallization of the ink sample in the video frame. The TROM evaluation process calculates 340 a total crystal area of the ink sample in received video frame. The TROM evaluation process also calculates 350 a number of crystals in the received video frame. The TROM evaluation process further calculates 360 an average crystal size of the ink sample in the received video frame. Each of these parameters is stored in a record along with a time measurement, the time measurement corresponding to the frame. The TROM evaluation process moves to the next video frame and performs 365 steps 310-360 for the next video frame. The TROM evaluation process determines if the last video frame in the ink sample has been reached. If the last video frame has not been reached, then the TROM evaluation process moves to the next video frame and performs steps 310-360 for the next video frame. The TROM evaluation process then utilizes the stored crystallization data and generates 370 a plurality of graphs. In an embodiment of the invention, one of the generated graphs plots a crystalline area coverage of the ink sample versus time; a second generated graph plots a number of crystals for each time; and a third generated graph plots average crystal size via time. This information is utilized to determine if the ink sample is a candidate for high speed printing and scale-up for further testing.

Figure 4A:
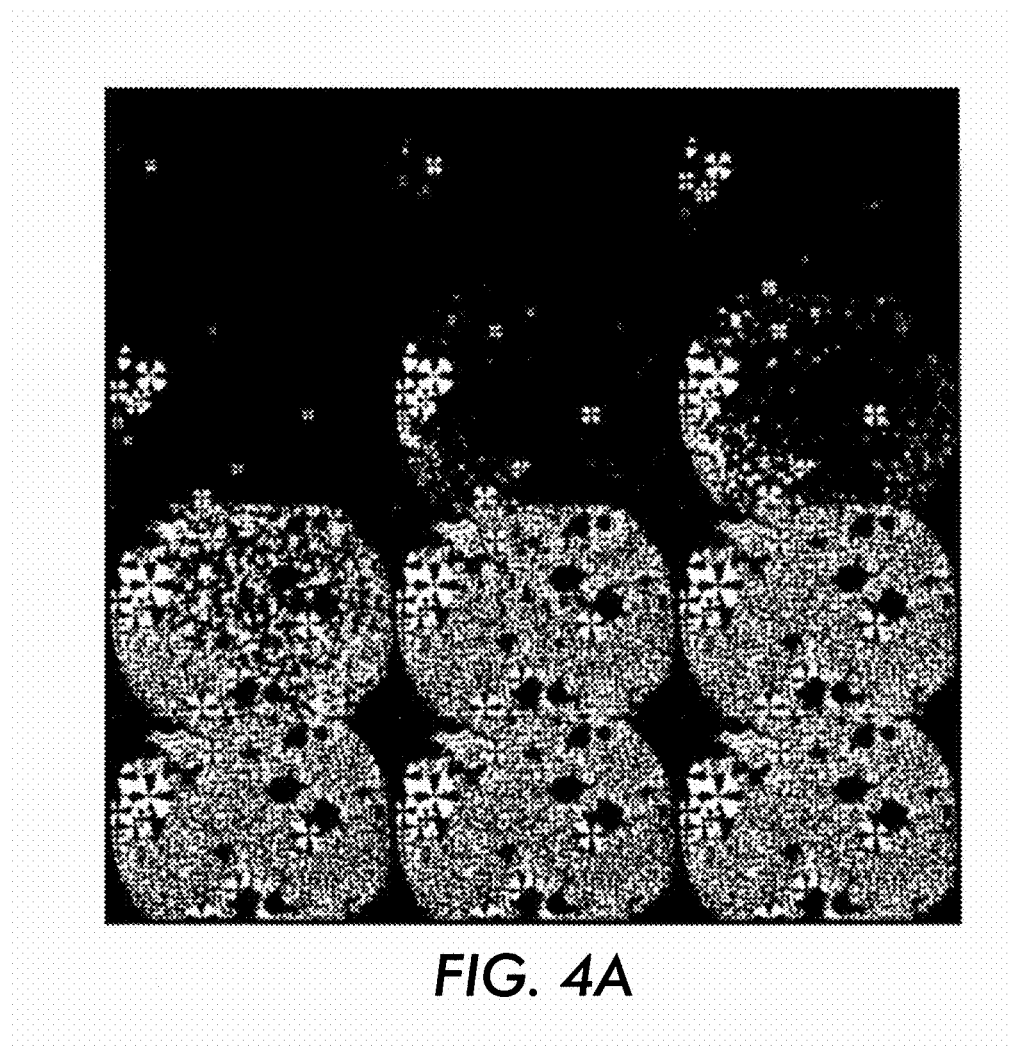
FIG. 4a discloses a montage of video frames from a sample spanning $T_{onset}$ to $T_{completion}$ according to an embodiment of the invention.
Figure 4B:
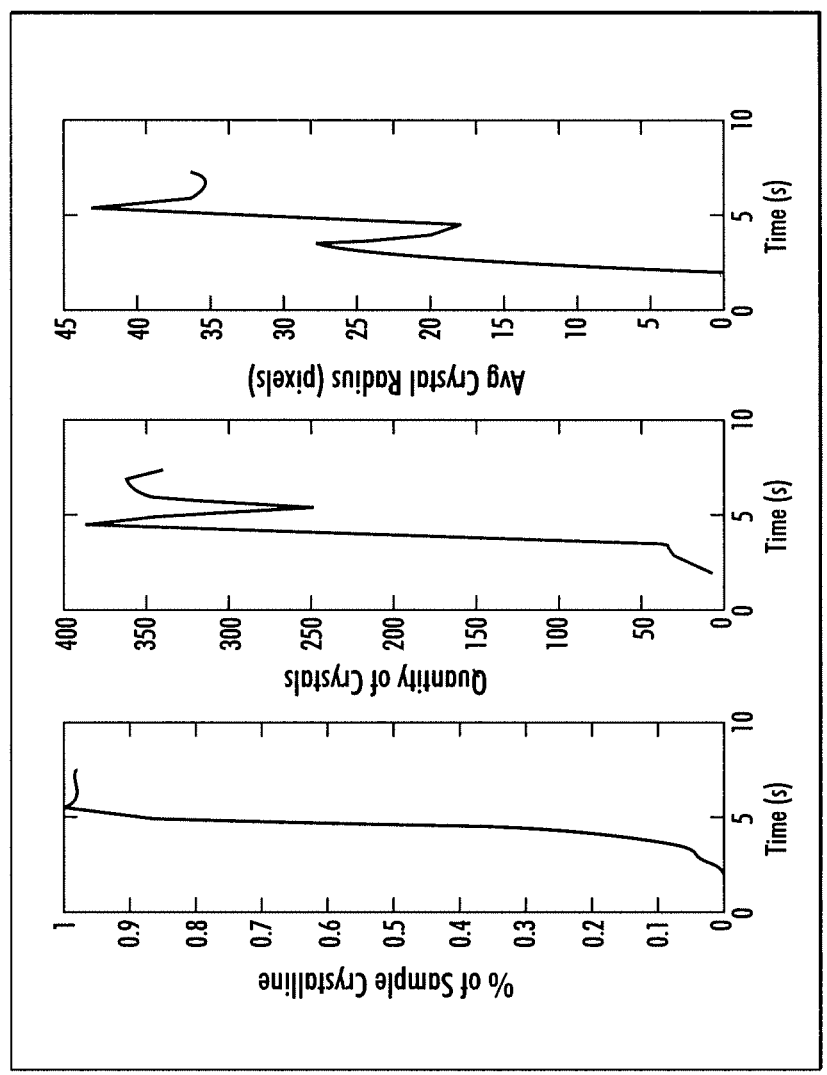
FIG. 4b discloses plotting percent crystallization, quantity of crystals and average crystal size versus time according to an embodiment of the invention.

FIG. 4a illustrates a montage of twelve video frames from the ink sample#19 as produced by the camera-POM apparatus according to an embodiment of the invention. The first frame starts in the upper left hand corner and moves across with the last frame ending in the bottom right hand corner. The first frame illustrates when the first crystal is formed. As is illustrated in FIG. 4a, the amount of crystals increases over time. FIG. 4b illustrates an output of plotting the crystallization variables for an ink sample that has tested according to the improved TROM video process. In FIG. 4b, percentage of crystallization, quantity of crystals and average crystal size are each plotted against time. These plots illustrate how the TROM evaluation process provides a fast, objective, and reproducible method for calculation. In embodiments of the invention, T90, i.e., time until 90% of the crystallization, is utilized as the time at which the crystallization process is measured. In other words, T90, which is used to determined whether or not to scale up an ink sample.

As crystals grow into each other, crystal boundaries become difficult to distinguish and the TROM evaluation software responds with a decrease in crystal count. Accordingly, it is best to measure and analyze crystal count and crystal size measurements at T50 (or 50% crystallization). Crystal counts and sizes are relative measurements which may also be used to predict ink performance in a printing device. Illustratively, the evolution of the % crystallization and size, as a function of time, may provide key information enabling optimized conditions for performing leveling of ink when printed.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A system for measuring the crystallization of crystalline-amorphous mixtures, comprising:
    a sample made of ink composition sandwiched between transparent substrates;
    a sample holder to hold the sandwiched ink sample;
    a heating apparatus to melt the sandwiched ink composition and to keep the melted ink composition at a first specified temperature for a first period of time;
    a cooling apparatus separate from the heating apparatus to receive the melted ink composition, to cool the melted ink composition and to maintain the cooled ink composition at a second specified temperature, wherein the cooling apparatus uses a liquid nitrogen delivery apparatus to maintain constant the cooling temperature;
    a microscope and a video recording device to capture images of the cooled ink composition for a second period of time, wherein the microscope is a polarized optical microscope to capture high contrast between crystalline and amorphous areas of the ink compositions to allow extraction of the crystallization parameters; and
    a computer, the computer including a memory, a processor and software instructions, wherein the memory stores the captured images; and the software instructions, when executed by the processor causes the computer to extract crystallization parameters about the cooled ink composition from the captured images, wherein the crystallization parameters identify fast solidifying crystalline inks that have a short time duration from onset of crystallization until crystallization.

2. The system of claim 1, wherein the transparent substrate includes two thin circular glass slides.

3. The system of claim 1, wherein the transparent substrates are isotropic.

4. The system in claim 1, wherein the transparent substrates are not crystalline.

5. The system of claim 1, wherein the ink composition has a thickness of 5 to 25 μm.

6. The system of claim 1, wherein the viscosity of the ink in the ink composition has a range of 10 to 12 centipoise (cps) during the heating of the ink composition.

7. The system of claim 1, wherein the ink composition is cooled to a temperature of approximately 40 degrees Celsius.

8. The system of claim 1, wherein the ink composition is cooled to a temperature of approximately 20 to 70 degrees Celsius.

9. A method of measuring crystallization rates of ink samples, comprising:
    placing an ink sample between two glass slides;
    heating the ink sample until the ink sample has a specified viscosity;
    transferring the heated ink sample to a cooling apparatus and cooling the heated ink sample to a predetermined temperature, wherein the cooling apparatus uses a liquid nitrogen delivery apparatus to maintain constant the cooling temperature;
    placing the cooled ink sample under a polarized optical microscope for magnification of viewing of the cooled ink sample, wherein the polarized optical microscope captures high contrast between crystalline and amorphous areas of the ink samples to allow extraction of the crystallization parameters;
    coupling a camera to the polarized optical microscope to capture images of the magnified cooled ink sample;
    storing the images of the magnified cooled ink sample;
    extracting crystallization data from the images of the magnified cooled ink sample, wherein the crystallization data includes a time when the first crystal appears, a duration of time from the time when the first crystal appears to completion of the crystallization and a time from when the cooled ink sample is placed on the cooling apparatus to an end of crystallization; and
    identifying fast solidifying ink samples with a small duration of time between when the first crystal appears to completion of crystallization.

10. A computer-implemented method for identifying crystallization parameters, wherein a video-processing computer includes instructions stored in a memory, which when executed by a processor of the video-processing computer causes the video-processing computer to:
    (a) receive a video frame of an analyzed ink sample, wherein the analyzed ink sample is obtained from heating an ink sample between two glass slides until the ink sample has a specified viscosity, transferring the heated ink sample to a cooling apparatus and cooling the heated ink sample to a predetermined temperature, wherein the cooling apparatus uses a liquid nitrogen delivery apparatus to maintain constant the cooling temperature, and placing the cooled ink sample under a polarized optical microscope for magnification of viewing of the cooled ink sample, wherein the polarized optical microscope captures high contrast between crystalline and amorphous areas of the ink samples to allow extraction of the crystallization parameters;
(b) perform image processing on the received video frame;
(c) calculate a total crystalline area of the ink sample in the received video frame;
(d) count a number of crystals in the ink sample in the received video frame;
(e) calculate an average crystal size of the ink sample in the received video frame;
(f) perform steps (a) to (e) on a plurality of image frames for the analyzed ink sample;
receive calculated data;
generate a graph of a crystalline area coverage for a measured time frame;
generate a graph of a number of crystals for the measured time frame; and
generate a graph of an average crystal size for the measured time frame.

11. The computer-implemented method of claim 10, the instructions which when executed by a processor of the video-processing computer causes the video-processing computer to:
identify a time at which the analyzed ink sample has a first crystallization percentage.

12. The computer-implemented method of claim 11, wherein the crystallization percentage is 90%.

13. The computer-implemented method of claim 10, the instructions which when executed by the processor of the video-processing computer causes the video-processing computer to:
identify a time at which the analyzed ink sample has a crystallization percentage of 50% and store a corresponding crystal size and crystal count at the crystallization percentage of 50%.

14. The method from claim 1 wherein:
(a) glass slides have a diameter of 16 to 25 mm diameter and a thickness comprised in between 0.20 and 0.50 mm;
(b) ink sample thickness is comprised in a range from 5 to 25 microns; and
(c) cooling temperature set at approximately 40° C.

15. The method from claim 1 wherein the ink sample composition can be colorless or colored including black or white.

16. The method from the claim 1 wherein the ink sample melts at a temperature comprised from 80° C. to 400° C.

* * * * *